Patented Nov. 26, 1940

2,223,304

UNITED STATES PATENT OFFICE 2,223,304

PROCESS FOR THE PREPARATION OF POLYAMIDES

Wilbur A. Lazier, New Castle County, Del., assignor to E. I. du Pont de Nemours & Company, Wilmington, Del., a corporation of Delaware No Drawing. Application January 4, 1940,
Serial No. 312,360

4 Claims. (Cl. 260—2)

This invention relates to synthetic polymers and, more particularly, to the preparation of polymeric materials from dicarboxylic acid amides.

This application is a continuation-in-part of copending application Serial No. 267,448, filed April 12, 1939.

This invention has as an object the preparation of polymeric amides. Another object is the conversion to polyamides of diamides derivable from dicarboxylic acids in which the carboxyl groups are separated by at least four carbon atoms in contiguous relation. Other objects will be apparent from the reading of the following description of the invention.

These objects are accomplished by bringing a diamide derivable from a dicarboxylic acid in which the two carboxyl groups are separated by at least four carbon atoms in contiguous relation and hydrogen into contact with a hydrogenation catalyst at a temperature between 200° and 450° C. and at a pressure in excess of 10 atmospheres.

The folowing examples set forth certain well defined instances of the application of this invention. They are, however, not to be considered as limitations thereof, since many modifications may be made without departing from the spirit and scope of this invention.

Example I

Seventy-two parts by weight of adipamide, 10 parts of an active cobalt-on-alumina catalyst, and 35 parts of ammonia were charged into a steel shaker-tube and hydrogenation was allowed to proceed at 260° C. under a total pressure of 500 to 700 atmospheres. The pressure drop amounted to about 170 atmospheres in three hours. The tube was then cooled to room temperature and its contents discharged. The catalyst was removed from the product by filtration. The latter was then distilled giving 3.6 parts of hexamethyleneimine, 7.6 parts of hexamethylenediamine, 7.5 parts of higher-boiling amines, and 27 parts of a clear non-volatile polymer which solidified when cooled. The heated polymer could be formed into any desired shape, which shape it retained on cooling. The warm polymer could also be spun manually into fibers of very small diameter.

Example II

A charge consisting of 72 parts by weight of sebacamide, 10 parts of an active nickel catalyst, 35 parts of liquid ammonia, and hydrogen was heated in an agitated steel tube at 260° C. under a total pressure of 600 to 650 atmospheres for three hours. The product was dissolved in methanol, the catalyst removed by filtration, and the filtrate distilled. After the removal of the methanol at slightly reduced pressure, the pressure was reduced to 1 to 2 mm. and the temperature of the bath was increased to 275° C. After 20 to 30 minutes under these conditions only a small amount of material had collected on the walls of the column, and no distillate was obtained. The polymeric residue, 56 parts, had a melting or softening point of 128° to 130° C. The product was manually spinnable, giving short fibers. An elementary analysis gave the values: %C, 69.8; %H, 11.5; %N, 8.2. These values together with the fiber-forming properties of the polymeric product indicate that it is a polyamide, presumably a linear polyamide of the general type described in U. S. Patent 2,130,948.

The invention is applicable to any amide derivable from a dicarboxylic acid in which the two carboxyl groups are separated by at least four carbon atoms in contiguous relation. Thus, malonamide, succinamide, glutaramide, phthalamide, and the like are not suitable for the preparation of polymeric products by the present process. Adipamide, however, is particularly suited for this purpose, as are also the amides derivable from mono-, di-, and poly-methyl adipic acids, pimelic acid; suberic acid; azelaic acid; sebacic acid; hexadecane-1, 16-dioic acid; 2-octyl sebacic acid; hydroaromatic dicarboxylic acids, e. g., hexahydroterephthalic and decahydronaphthalene 1,5-dicarboxylic acids; cyclohexane 1,2-diacetic acid; and the like.

The diamides may be prepared by any of the known methods; for example, by reacting the proper dicarboxylic acid or its ester, acid anhydride, or acid halide with ammonia at appropriate temperatures and pressures, or by treating the dicarboxylic acid with slightly more than one mole of urea at temperatures of 125° to 200° C.

As a convenient modification of the process, the diamides may be formed in situ during the reaction. For example, I may substitute for a diamide a mixture of the free ester, acid anhydride, or acid halide with sufficient ammonia to give the ammonium salt or amide during the initial stages of the hydrogenation reaction.

The catalysts found suitable for carrying out this invention are those which are usually designated as hydrogenation catalysts. These may consist of a hydrogenating component such as a hydrogenating metal or metal oxide, together with a dehydration component such as a compound selected from the group known technically as dehydration catalysts. Examples of hydrogenation catalysts are reduced metals such as silver, copper, tin, cadmium, iron, cobalt, and nickel. These metallic catalysts may be promoted with oxide promoters such as aluminum oxide, manganese oxide, zinc oxide, magnesium oxide, or chromium oxide. The promoted catalysts may be physical mixtures or chemical compounds. The metallic catalysts may be used in the form of a powder. If a dehydration component is also used, it may be any of the well known dehydration catalysts; for example, alumina, chromium oxide, silica, thoria, kaolin, blue oxide of tungsten, etc. These may be in the form of supporting material for the catalyst. An illustration of such a catalyst is found in Example I, where cobalt is supported on alumina. Certain metallic oxides belong to the class of compounds known as difficultly reducible oxides and have both hydrogenating and dehydrating properties. Such compounds come clearly within the class of catalysts that may be used in this invention. By the term "difficultly reducible" is meant that the oxides are not substantially reduced to metal by prolonged exposure in a state of purity to the action of hydrogen at atmospheric pressure and at a temperature of 400° to 450° C. Such oxides suitable for the hydrogenation of amides are zinc oxide, manganese oxide, magnesium oxide, etc. These oxides may be employed either alone or in combination with each other or with other oxides which have a promoting action. Preferably the oxide employed as a promoter for the hydrogenating metal or oxide has little activity of itself or is much less active than the hydrogenating oxide employed with it, yet it serves to further promote the activity of the more active oxide.

In the carrying out of this reaction temperatures within the range of from 200° to 450° C. have been found to be suitable. In general, however, it is preferred to operate within the temperature range of 225° to 300° C. The process is operable under pressures in excess of 10 atmospheres. Nevertheless, the reaction is not restricted to any maximum pressure range and any pressure may be used which is within the mechanical limits of the equipment employed. The hydrogenation reaction is faster at the higher pressures and for this reason a pressure range of from 100 to 1000 atmospheres is favored.

Since the product may contain volatile by-products in addition to the desired polymer it is necessary for most purposes to purify the polymer by heating in a vacuum to drive away volatile materials, by blowing with steam, nitrogen or other inert gas, by reprecipitation, or by other known methods of purification.

The process of this invention provides a simple means for producing polymers from amides in one step.

A solvent is desirable in the carrying out of the reaction, but is not necessary. Examples of suitable inert solvents are ammonia, cyclohexane, decalin, purified mineral oil, and the like. Of these ammonia is preferable.

The products of this invention may be used alone or in combination with other polymers, resins, plasticizers, pigments, dyes, etc.

As many apparently widely different embodiments of this invention may be made without departing from the spirit and scope thereof, it is to be understood that I do not limit myself to the specific embodiments thereof except as defined in the appended claims.

I claim:

1. A process for the production of polymeric materials which comprises bringing a dicarboxylic acid diamide having at least four carbon atoms in contiguous relation between the carboxyl groups and hydrogen into contact with a hydrogenation catalyst at a temperature within the range of 200° to 450° C. and at a pressure in excess of 10 atmospheres.

2. The process in accordance with claim 1 characterized in that the reaction is carried out at a temperature within the range of 225° to 300° C.

3. The process in accordance with claim 1 characterized in that the reaction is carried out at a pressure within the range of 100 to 1000 atmospheres.

4. The process in accordance with claim 1 characterized in that the reaction is carried out in an inert solvent.

WILBUR A. LAZIER.